Sept. 4, 1928.

R. BERGERIOUX 1,682,735

SEED AND GRAIN DISTRIBUTOR

Filed April 7, 1926   2 Sheets-Sheet 1

INVENTOR:
Rene Bergerioux
By Richards & Geier
Attys.

Sept. 4, 1928.  
R. BERGERIOUX  
1,682,735  
SEED AND GRAIN DISTRIBUTOR  
Filed April 7, 1926  
2 Sheets-Sheet 2

INVENTOR  
Rene Bergerioux

Patented Sept. 4, 1928.

1,682,735

UNITED STATES PATENT OFFICE.

RENÉ BERGERIOUX, OF REUILLY, FRANCE.

SEED AND GRAIN DISTRIBUTOR.

Application filed April 7, 1926, Serial No. 100,460, and in France October 13, 1925.

In apparatus which provides for the bottom feed of material in the form of grains or powder, and in the dry or the wet state, it will frequently happen—and chiefly in the case of wet material such as certain fertilizers or where the feeding slope is insufficient—that a portion of the said material will adhere to the walls of the feeding vessel and will progressively retain the adjacent layers, so that only a central portion of the material will be distributed in a normal and regular manner. For like reasons, should the delivery outlet be insufficient, it will be obstructed and the supply will be thus arrested.

Means are in use for obviating such defects which consist in stirring up the mass of material by the use of rods; which is however fatiguing and unpractical; or in employing mechanical stirring means which consume a large amount of power and are often stopped by the mechanical resistance of the material.

My invention has for its object to replace the known devices, which have but little practical value, by a simple and substantial apparatus whereof one or more parts are rotated with reference to the material to be distributed, both by the pressure, by disaggregation and by scraping, thus operating upon the whole volume of the substance and obviating all partial or irregular feeding.

The appended drawings show by way of example an embodiment of the invention, wherein I employ a stirring element revoluble in a stationary vessel, but it is obvious that the vessel may be revoluble and the stirring means stationary, or both devices may be revoluble provided the rotation takes place in opposite directions or at different rates.

In all cases the bottom feeding device—should such exist—is of any suitable construction whether stationary, or movable. As concerns the rotation of the operative parts, each of the parts may be rotated in one or the other direction and the motion may be constant or variable, alternating or in one direction, intermittent or uniform, the mechanical means employed to obtain these combinations being known per se.

In order to further in certain cases the formation of the central discharge channel in the said vessel, I may dispose at the lower part of the shaft of the stirring device one or more small radial arms whose rotation will aid in the formation of the channel by an additional disaggregation of the material.

Figure 1:
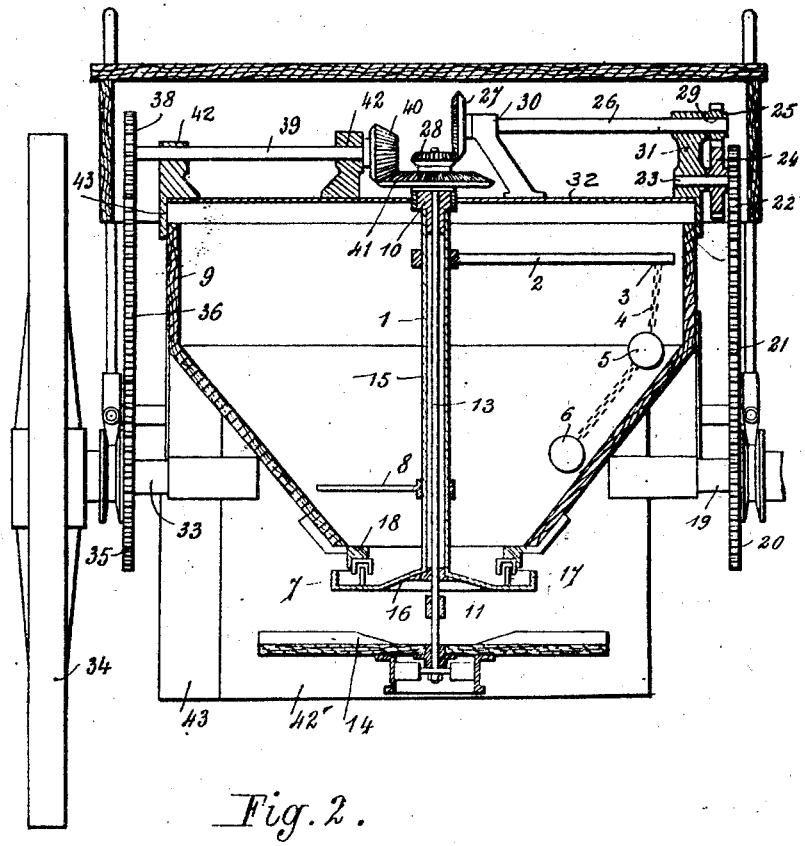
Fig. 1 is a sectional view of a feeding apparatus for fertilizer, grain or seeds, provided with my improved stirring device and with a revoluble feeding device disposed at the lower part between the vessel or hopper and the scattering device.
Figure 2:
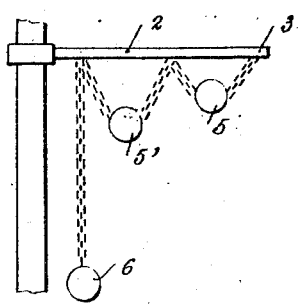
Fig. 2 is a modification of the stirring device shown in Fig. 1.

The shaft 1 of the apparatus comprises at the lower part a radial arm 2 at whose outer end is mounted a flexible connecting member 4 to which are attached at various points the balls 5 and 6; when in the inoperative position, the ball 6 will be somewhat above the lower feeding element 7. At the lower end of the shaft 1 is mounted a small radial arm 8. The number of arms 2 or 8 is optional, as well the number of flexible members 4 upon each arm; said members may be replaced by like members of a flexible nature, and the number, shape and position of the heavy masses thereon will be optional. In the modification (Fig. 2) the common connecting member 4 is connected at various points with the arm 2.

The upper cross members disposed upon the vessel 9 are adapted to support the mechanism by means of a central bearing 10 which is connected with the vessel by cross members or in like manner.

The bearings 10 and 11 support the central shaft 13, and on the lower end of the shaft outside the vessel 9 is mounted the scattering element. On the outer part of the bearing 10—forming a guide—is rotatable the hollow shaft 15 carrying the feeding element 7 and the stirring arm 2. Circular recesses or like means showing the adjustment may be provided upon the outer periphery of the feeding element; the said element herein comprises a central inclined part 16 and the vertical rods 17 for breaking up the lumps in combination with the forks 18 mounted on the bottom of the vessel 9. The said feeding element may be provided with any suitable means for effecting and observing the adjustment.

The various movements of the revoluble parts are obtained by means of the wheels carrying the machine, in the following manner:

The shaft 19 of one of the said wheels actuates—through the medium of the chain wheel 20 and the chain 21—the chain wheel 22 which is loose on the axle 23 secured to the machine frame. The wheel 22 is secured to a gear wheel 24 engaging the like wheel 25 keyed to the shaft 26 which carries at the other end a bevel gear wheel 27 engaging a like wheel 28 mounted on the shaft of the scattering element 14. The shaft 26 is mounted in the bearings 29 and 30, the bearing 29 being formed in one with the support 31 whilst the bearing 30 is mounted on the cross member 32.

The shaft 33 of the second carrying wheel 34 actuates—through the medium of the chain wheel 35 and the chain 36—a chain wheel 38 keyed to the shaft 39 whose other end carries the bevel gear 40 engaging the like gear 41 mounted on the hollow shaft of the feeding element 7, the shaft 39 being mounted in bearings 42.

A screen 42' is disposed on the vessel at the lower front part of the apparatus so that the scattered material will not interfere with the hitching gear of the machine. The said screen comprises a vertical board 43 which is terminated on the side at which the material is scattered by a vertical board, inclined towards the front.

Figure 3:
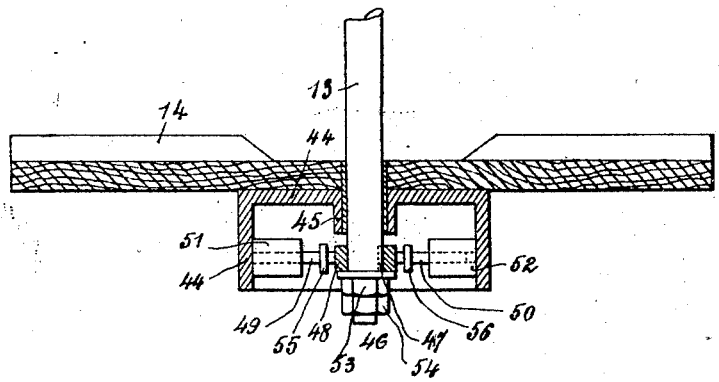
Fig. 3 shows the means for the progressive drive of the scattering device.

At the bottom of the scattering element 14 and coaxial therewith (Fig. 3) is mounted the box 44 having a central bearing portion 45 for the shaft 13 extending therethrough.

The lower end 46 of the shaft 13 is screwthreaded, and above the screw-threads is a square part 47 coacting with a square aperture in a disk 48 carrying the two rods 49 and 50 in opposite position and along which the heavy masses 51 and 52 may be displaced. The nut 53 and the lock nut 54 are screwed upon the part 46 to maintain the disk 48 against the shaft by their contact therewith. The abutments 55 and 56 serve to limit the movement of the masses 51 and 52 towards the center of the arrangement. Furthermore, when the disk 48 is mounted, it will maintain the bearing 45 in which the shaft 13 is rotatable.

When the shaft 13 is set running by the mechanism, it actuates the disk 48, and when the centrifugal force becomes sufficient, the masses 51 and 52 will make contact with the inner wall of the box 44, thus rotating the latter at a rate depending upon the speed of the shaft.

Figure 4:
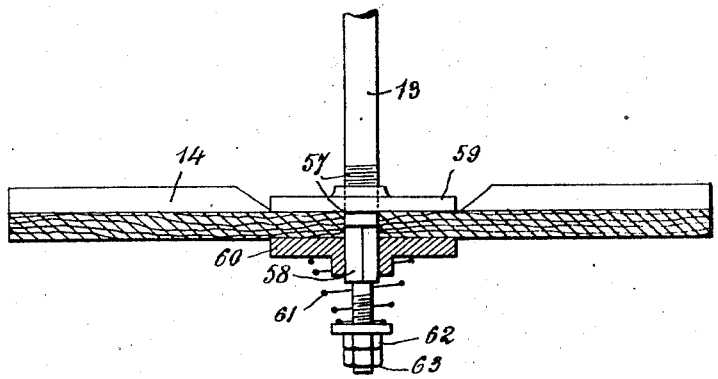
Fig. 4 is a modification of the device shown in Fig. 3.

In the construction shown in Fig. 4, the shaft 13 is screwthreaded at 57 and comprises a square part 58. To the part 57 is secured an upper disk 59, and upon the square part 57 is mounted a lower disk 60 having a corresponding square recess.

The scattering member 14 is held between the said plates, by means of the spring 61 whose tension can be adjusted by the nut 62 screwed upon the threaded end of the shaft 13 and maintained—after adjustment—by the lock nut 63 affording a tight disposition.

When the shaft 13 rotates it effects the rotation of the discs 59 and 60, and also—by progressive friction—the rotation of the scattering member 14.

Obviously, I may employ other means for this progressive rotation, the two examples being given solely by way of indication. I may further dispose a band of plastic material on the end of each mass 51 or 52, or on the inner wall of the box 44, to increase the adhesion of the parts, and like means may be employed for the parts of the scattering member 14 which make contact with the discs 59 and 60.

I claim:

1. In a machine for stirring and distributing material in the form of fertilizer, grains and powder, a container, a plurality of shafts extending through said container, means for driving said shafts independently of each other, a projector operated by one of said shafts, a distributor operated by the other shaft, and a stirrer in said container simultaneously actuated by the same shaft which operates said distributor.

2. In a machine for stirring and distributing material in the form of fertilizer, grains and powder, a container, a plurality of shafts extending through said container and arranged concentrically one within another, means for driving said shafts independently of each other a projector operated by one of said shafts, a distributor operated by the other shaft, and a stirrer in said container simultaneously actuated by the same shaft which operates said distributor.

Signed at Paris, Seine, France, this twenty-third day of March, A. D. 1926.

RENÉ BERGERIOUX.